United States Patent
Turner

[11] Patent Number: 6,073,332
[45] Date of Patent: Jun. 13, 2000

[54] CORROSION RESISTANT TUBULAR SYSTEM AND METHOD OF MANUFACTURE THEREOF

[76] Inventor: William C. Turner, 85 Pinto La., Sedona, Ariz. 86351

[21] Appl. No.: 09/037,318

[22] Filed: Mar. 9, 1998

[51] Int. Cl.[7] .............................. B23P 11/00; F16L 9/147
[52] U.S. Cl. .............................. 29/456; 29/557; 29/558; 285/55; 285/52
[58] Field of Search .............................. 285/55, 52, 329, 285/917; 29/456, 557, 558

[56] References Cited

U.S. PATENT DOCUMENTS

| | | | |
|---|---|---|---|
| 3,253,841 | 5/1966 | Ahmad | 285/55 |
| 3,620,555 | 11/1971 | Hinds | 285/55 |
| 4,026,583 | 5/1977 | Gottlieb | 285/55 |
| 4,400,019 | 8/1983 | Fruck | 285/55 |
| 4,509,776 | 4/1985 | Yoshida et al. | 285/55 |
| 4,524,996 | 6/1985 | Hunt | 285/55 |
| 4,620,660 | 11/1986 | Turner | 228/186 |
| 4,709,946 | 12/1987 | Hunter | 285/55 |
| 4,744,504 | 5/1988 | Turner | 228/127 |
| 4,852,655 | 8/1989 | Guy | 285/55 X |
| 5,363,545 | 11/1994 | Hirano et al. | 29/557 X |
| 5,549,336 | 8/1996 | Hori et al. | 285/333 |

FOREIGN PATENT DOCUMENTS

| | | | |
|---|---|---|---|
| 886457 | 11/1971 | Canada | 285/55 |
| 1 022 860 | 1/1958 | Germany | 285/55 |
| 26 33 465 | 2/1978 | Germany | 285/55 |
| 404136589 | 5/1992 | Japan | 285/55 |
| 836825 | 6/1960 | United Kingdom | 285/55 |

*Primary Examiner*—Anthony Knight
*Attorney, Agent, or Firm*—Head, Johnson & Kachigian

[57] ABSTRACT

A corrosion resistant tubular system is formed of a length of pipe in which each of the opposed ends terminate in a reduced external diameter integral tubular lip portion and, spaced from the lip portion, increased diameter external threads compared to the tubular lip portion, the lip portion having an external circumferential frusto-conical surface and a tubular coupling having internal threads adjacent each of the ends thereof and having, spaced inwardly from each of the internal threads a reduced internal diameter circumferential sealing surface that is tapered in a frusto-conical shape, the interior of the tubing and the coupling being formed of corrosion resistant metal alloy. When assembled a telescopic mating relationship is established between the external conical surface of the pipe and the internal conical surface of the coupling.

3 Claims, 3 Drawing Sheets

CORROSION RESISTANT TUBULAR SYSTEM AND METHOD OF MANUFACTURE THEREOF

REFERENCE TO PENDING APPLICATIONS

This application is not related to any pending applications.

REFERENCE TO MICROFICHE APPENDIX

This application is not referenced in any microfiche appendix.

BACKGROUND OF THE INVENTION

Handling corrosive fluids, that is, corrosive liquids and/or gases, has been a serious problem for the petroleum and chemical industries almost from the founding of these industries. This problem is increasing, particularly in the petroleum industry since much of the world's recoverable hydrocarbons are in the form that is frequently referred to as "sour crude". That is, crude oil that is inheritantly corrosive. The chemical industry encounters similar problems in treating, processing and storing corrosive liquids and gases. The production of crude oil from a subterranean formation to the earth's surface, the transport of crude oil from a producing well to a storage facility and from a storage facility to a refinery frequently involves movement of fluid through pipes. The same occurs in the chemical industry in that piping is an essential part of chemical processing facilities.

While piping can be made entirely of corrosion resistant materials, such as plastics and fiberglass, much of the petroleum and chemical industry requires piping that must withstand higher pressures and more tensile strength that is available with plastics or fiberglass. Accordingly, much of the piping utilized in the petroleum and chemical industries is formed of metal. Steel obviously is the most common metal used in manufacturing pipes because of its high strength, machinability, economy and ready availability. While steel has many important attributes that recommend it for high strength or high pressure piping, it has the serious limitation that steel is readily attacked by many, if not most, corrosive liquids and gases. Accordingly, much effort has gone into devising methods of manufacturing high strength and high pressure resistant piping utilizing steel as an outer core with an inner core formed of a corrosion resistant alloy. Such piping takes advantage of the strength and relative economy of steel with the advantage of a corrosion resistant internally clad alloy that enables piping to transport corrosive, liquids or gases without the corrosive components attacking the piping outer steel shell.

A method of manufacturing an internally clad tubular product is described in detail in co-pending U.S. patent application Ser. No. 08/939,305 entitled "An Improved Method is of Manufacturing An Internally Clad Tubular Product". For additional background information relating to internally clad metallic tubular products, see U.S. Pat. No. 4,620,660 entitled "Method of Manufacturing An Internally Clad Tubular Product" that issued on Nov. 4, 1986 and U.S. Pat. No. 4,744,504 entitled "Method of Manufacturing A Clad Tubular Product By Extrusion" that issued on May 17, 1988. Each of these are incorporated herein by reference.

The techniques detailed in the two previously issued patents and the pending application referenced above provide for manufacturing internally clad tubular products. However, a tubular clad pipe to be successfully utilized must be used in a system that provides for means of coupling lengths of pipe together to take advantage of the internal corrosion resistant cladding of the pipes. This is the subject of this disclosure, that is, this invention provides an improved corrosion resistant tubular system that employs internally clad tubular pipes and internally clad couplings.

BRIEF SUMMARY OF THE INVENTION

The invention herein provides an improved tubular system particularly adaptable for conveying corrosive liquids or gases. The term "corrosive" is used herein to mean liquids or gases that tend to attack and therefore shorten the useful life of steel pipe. The tubular system is intended to provide piping useful where high strength or high pressure resistant characteristics are required, that is, corrosive resistant pipe that exceeds the strength and pressure resisting characteristics of plastic and fiberglass. As an example, much of the crude oil remaining in the world that is readily available is called "sour" crude, that is, it is typically characterized by hydrogen sulfide content that makes the crude oil acidic to the point that it attacks many metals and particularly steel so that the normally employed steel piping used in the petroleum industry can't be successfully used for such sour crude. In a similar manner, many chemical industrial applications cannot use readily available piping materials because of the corrosiveness of the liquids or gases.

A typical tubular system that includes the practice of the invention herein is exemplified by a length of pipe and a coupling. Most piping systems are made up by threading together lengths of pipe by the use of interspersed couplings and therefore a piping system of indefinite length can be attained using a plurality of lengths of pipe with an equal number of couplings. Therefore, the invention will be described as it is employed to attach a coupling to one end of a pipe with the understanding that this system is repeated as frequently as necessary to attain a tubular piping system of any required length.

The basic concept of the system employs a specific design on the opposed ends of lengths of pipe to be joined, the designs on the opposed ends of each pipe being identical. The end of a length of the pipe in practicing this invention terminates in a reduced external diameter integral tubular circumferential lip portion. Spaced from the lip portion in the direction towards the opposite end of the pipe are external threads, the threads having increased diameter compared to the tubular lip portion. The tubular lip portion has an external circumferential surface that is frusto-conical with increased external diameters in the direction towards the threads.

A tubular coupling is in the form of a short length cylindrical member that has opposed ends. Each end has internal threads. Spaced inwardly from the internal threads in the direction towards the coupling opposed end is a reduced internal diameter circumferential sealing surface. The sealing surface is tapered in a frusto-conical shape with decreased internal diameters in the direction towards the coupling opposed end.

The coupling frusto-conical sealing surface is dimensioned to telescopically and sealably mate with the pipe circumferential lip portion external frusto-conical surface so that when a coupling is firmly threaded onto the end of a pipe the frusto-conical surfaces engage each other in a leak proof seal arrangement.

In the preferred practice of the invention, the pipe is internally clad with a cladding material that is corrosion resistant, a typical cladding material being a nickel alloy.

The tubular member that is employed in practicing the invention can be obtained from a manufacturing process in which a first smaller diameter pipe of corrosion resistant material is inserted into an outer pipe of high strength metal, such as a steel pipe. The annular area between the exterior of the corrosion resistant inner pipe and the interior of the outer pipe is sealed and thoroughly evacuated of substantially all water and oxygen. Thereafter a mandrel is inserted into the interior pipe and the assembly is heated and swedged to reduce the wall thickness of the inner and outer pipes to bond the inner corrosion resistant pipe to the interior surface of the outer pipe. When a pipe so manufactured is employed in practicing the present invention, the reduced external diameter integral tubular circumferential lip portion is formed in a way so that at least the interior surface of the lip portion encompasses the corrosion resistant interior portion of the fused pipe.

The external surface of the integral tubular circumferential lip portion formed on the pipe is manufactured by using a layer of corrosion resistant alloy metal. This can be accomplished by forming a layer of corrosion resistant alloy utilizing electric welding techniques by which a series of beads of the corrosion resistant metal are deposited on the exterior surface of the circumferential lip portion of the pipe. Thereafter, the deposited corrosion resistant material is machined to provide a smooth circumferential frusto-conical surface.

Short length blanks for forming the tubular coupling of the piping system can be manufactured by first making an elongated pipe having an internally clad surface of corrosion resistant alloy material in the method as above described, however, when making the pipe the thickness of the internal cladding material is substantially greater than is normally employed in making a usual internally clad pipe. After an elongated pipe is made in this manner it is cut into short lengths to form blanks for use in making couplings, the length of the blank cut being that of the desired length of the completed coupling. A coupling is manufactured employing a blank by first forming an internal thread in each end. Next, a sealing surface is machined internally of the coupling at each end inwardly from the formed threads. The sealing surface is of reduced internal diameter compared to the threads and is formed within the corrosion resistant bonded inner liner of the coupling. The sealing surface is machined to have a frusto-conical shaped taper that matches the frusto-conical annular lip portion of the pipe.

When the coupling and pipe ends have been manufactured as described the coupling can be threaded onto the end of a pipe until the frusto-conical surface of the pipe thoroughly seats against the frusto-conical sealing surface of the coupling. All internal areas of the assembled coupling and pipe that are exposed to liquids or gases passing through the pipe system are defined by corrosion resistant alloy.

The tubular system herein provides a coupling arrangement in which, in one embodiment, a pipe end and a coupling end are machined to obtain, when a coupling is assembled onto a pipe end, a conical seal, an inner toroidal seal and an outer toroidal seal.

A better understanding of the invention will be obtained from the following description of the preferred embodiments, taken in conjunction with the attached drawings.

DETAILED DESCRIPTION OF THE PREFERRED EMBODIMENTS

Figure 1:
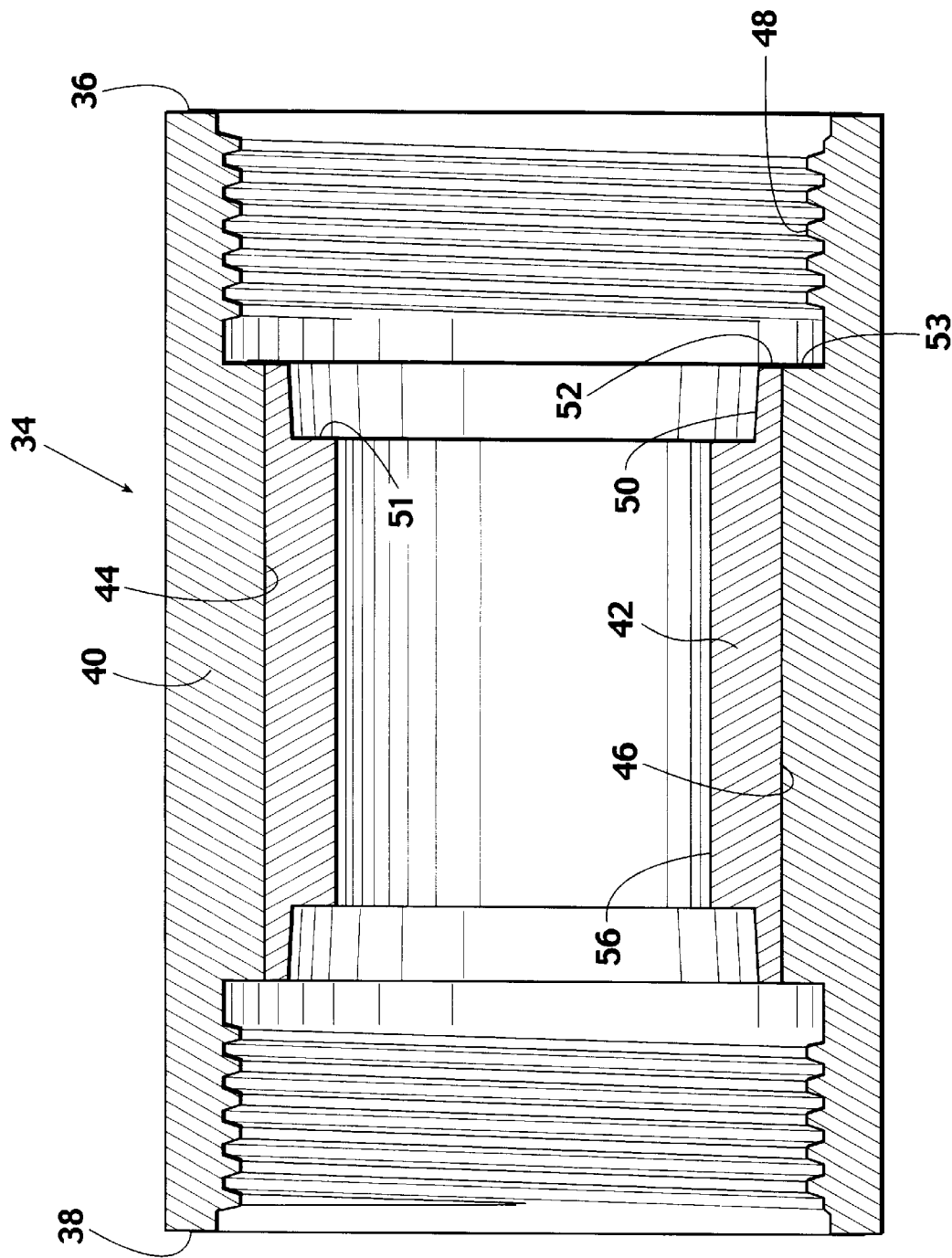
FIG. 1 is a cross-sectional view of a coupling that can be used in providing a corrosion resistant tubular system according to this invention.
Figure 2:
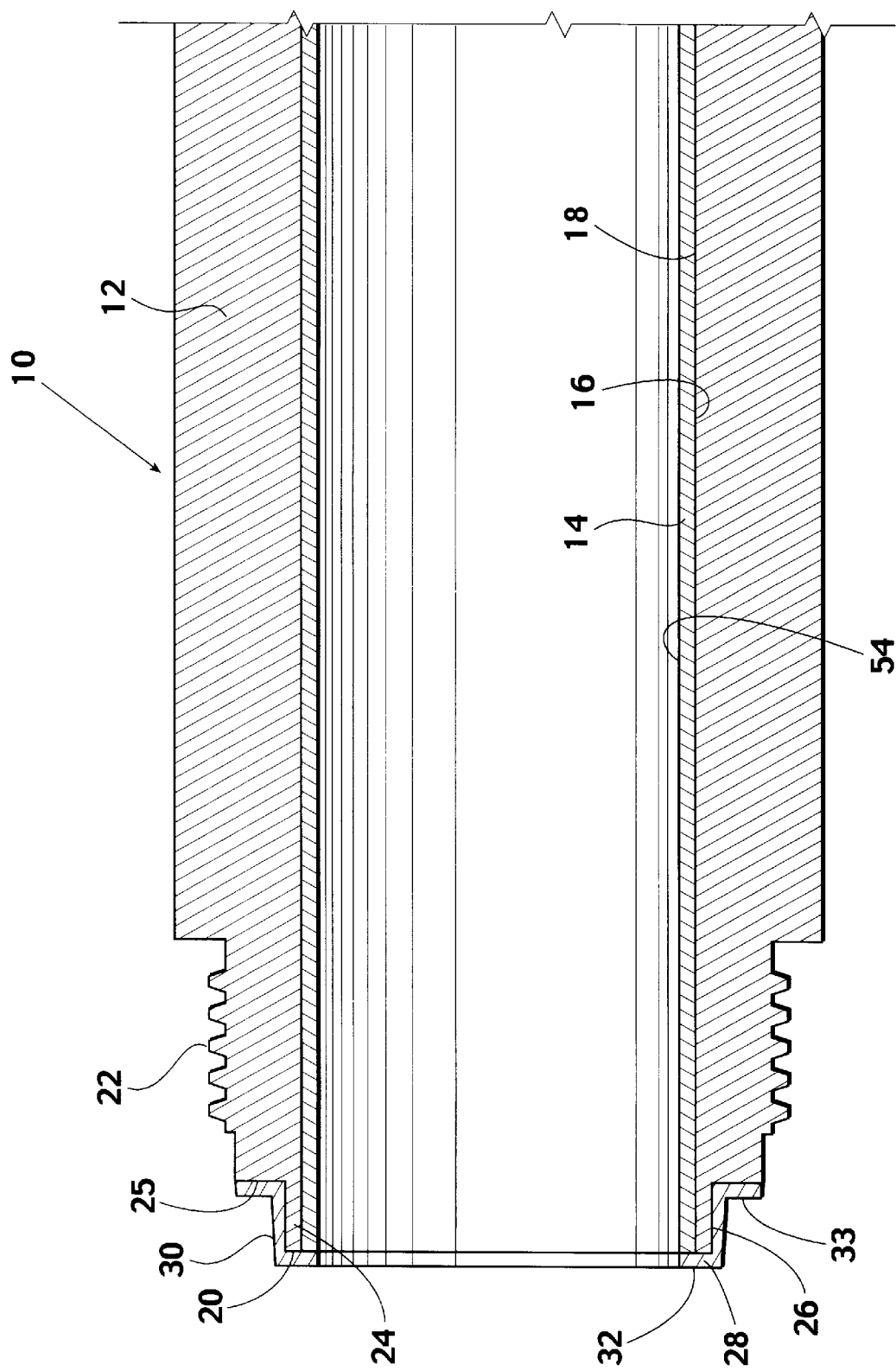
FIG. 2 a cross-sectional view of an end portion of a length of pipe that has been machined to provide the required geometry for mating with the coupling of FIG. 1.

Referring to the drawings and first to FIGS. 1 and 2, the two basic components that provides a corrosion resistant tubular system of this invention are illustrated. The system is particularly applicable to providing piping wherein lengths of pipe are connected end to end to each other, employing couplings in the typical manner that metal piping has long been utilized in industry and is specifically concerned with internally clad tubular pipes. In the background of the invention, reference has been made to pending U.S. patent application Ser. No. 08/939,305 entitled "An Improved Method of Manufacturing An Internally Clad Tubular Product" and to previously issued U.S. Pat. No. 4,620,660 entitled, "Method of Manufacturing An Internally Clad Tubular Product" and U.S. Pat. No. 4,744,504 entitled, "Method of Manufacturing A Clad Tubular Product By Extrusion". This patent application and two previously issued United States patents are incorporated herein by reference. These three references teach methods of manufacturing internally clad piping that is particularly applicable in the practice of the invention described herein.

FIG. 2 shows an end portion of a tubular pipe, such as a pipe that could have been manufactured utilizing the teachings of any one of the three above identified references or a combination of the teachings of these three references. Essentially, FIG. 2 shows an end portion of a length of internally clad pipe generally indicated by numeral 10, formed of an external tubular host 12 and an internal tubular cladding member 14. The external cylindrical surface 16 of cladding member 14 is fused to the internal cylindrical surface 18 of tubular host 12. When properly fused the internally clad pipe becomes essentially a unitary item in that the bonding strength securing cladding member 14 to tubular host 12 is of strength substantially equal to the tensile strength of the material of which the cladding material 14 is formed. Whereas in FIG. 2, a sharp line of demarcation is used to show separation of the cladding member 14 from the tubular host in actual practice. Once a tubular host member has been internally clad and if a clad member is cut in a cross-section as illustrated in FIG. 2, the demarcation between the cladding member and the tubular host is blurred.

Internally clad pipe 10 has a first end 20 and an opposed end that is not shown with the understanding that in practicing the invention, the opposed end would have an appearance identical to that shown in FIG. 2. The end portion of the pipe is machined to provide threads 22. The illustrated threads are typical of the type commonly employed on tool joints as used in the petroleum industry instead of usual pipe threads as utilized in the plumbing trade wherein the threads are substantially triangular in cross-sectional shape. It is understood that the shape of threads 22 is not relevant to the practice of this invention. Threads 22 are intended to be representative of any known type of threads as would be employed by a manufacturer in practicing the invention according to the preference of the industry for which the tubular products are used.

At the outer end 20, and spaced outwardly from threads 22, an integral reduced external diameter circumferential lip portion 24 is provided. By this is meant that the end portion of pipe 10 is cut away so that adjacent the end 22 is the reduced external diameter circumferential lip portion 24. Forming lip portion 24 results in a radial toroidal planar shoulder surface 25. In FIG. 2, the lip portion 24 has a cylindrical external surface 26, although surface 26 could be frusto-conical for reasons to be subsequently explained. Further, the diameter of circumferential surface 26 is such that the lip portion 24 is formed of the same material as tubular host 12 which is another way of saying that the cladding member 14 remains internally of circumferential lip portion 24 with the cladding member 14 extending all the way to the tubular member end 20.

End surface 20 and cylindrical external surface 26 that define along with circumferential lip portion 24 and shoulder surface 25 are all formed integrally with tubular host 12 and are therefore of the structural metal of the tubular host which, as previously indicated, is typically steel. To protect these surfaces against the attack of corrosive material, a protective cap 28 is provided. After surface 26 has been machined on, the pipe tubular host material 12 adjacent the pipe end 20 a layer of corrosive resistant alloy material is laid down on the circumferential surface 26, end surface 20 and shoulder surface 25 by use of an electric welding process wherein by electric arc welding beads of corrosive resistant alloy material are welded to surfaces 20, 25 and 26. After beads of corrosive resistant alloy have been laid down on the surfaces by electric welding, the welded material is then machined to provide protective cap 28. The protective cap has an external circumferential surface 30, a planar toroidal end surface 32 and a torque shoulder surface 33. In the process of machining, the laid down corrosion resistant metal alloy on the exterior of circumferential lip 24, circumferential surface 30 is shaped to be frusto-conical. That is, surface 30 increases in external diameter in the direction towards threads 22 which, of course, is in the direction towards the opposite end of pipe 10. Providing such frusto-conical surface at the end of pipe 10 is an important aspect of the invention for reasons to be described subsequently.

Referring now to FIG. 1, a coupling for use in the system of this invention is illustrated, the coupling being indicated generally by the numeral 34. Coupling 34 has a first end 36 and an opposed second end 38. The internal arrangements of the coupling at ends 36 and 38 is the same, so only the internal geometrical structure of the first end 36 will be described.

As previously stated, the coupling 34 is preferably manufactured in the form of an elongated length of pipe in which a pipe external tubular host member 40 has received an internal cladding member 42. More specifically, the body of coupling 34 is formed of a tubular host having an internal cylindrical surface 44 to which the external surface 46 of a corrosion resistant cladding member 42 has been bonded so that in essence, the cladding member 42 and tubular host 40 become an inseparable unitary item in which, in an actual cross-sectional view, the line of demarcation between the two would be obscure and at best ill defined.

In the process of manufacturing a coupling as shown in FIG. 1 a preferred arrangement is, after an internally clad tubular product has been manufactured, it is cut in short lengths, or blanks, from which couplings are manufactured.

As has been stated, the internally clad pipe of FIG. 2 is preferably of the type formed to have internally bonded cladding member 14 and the coupling 34 is formed of a similar internally clad pipe. One difference that is visually obvious when comparing the tubular coupling of FIG. 1 to the tubular pipe of FIG. 2 is that the coupling is formed of a length of internally bonded pipe in which the cladding member 42 is substantially thicker than the cladding member 14 of pipe 10. The method of manufacturing remains the same, the only difference being that in the manufacturing process to obtain the blanks from which couplings 34 are made, the internal cladding member inserted within the tubular host is substantially thicker before the swedging operation begins so that the completed internally clad pipe has a relatively thicker tubular cladding member 42 as illustrated.

After a short length tubular blank has been cut from a length of pipe, internal threads 48 are machined in the ends of the blank. Threads 48 are dimensioned and shaped to threadably match the threads 22 of pipe 10. Inwardly of threads 48, a sealing surface 50 is machined that is of frusto-conical configuration wherein the internal diameter decreases in the direction away from coupling end 36. The shape of sealing surface 50 is intended to match the circumferential frusto-conical surface 30 formed on the end of pipe 10 of FIG. 2. Machining conical surface 50 also results in an internal radial toroidal surface 51.

By providing a relatively thicker cladding member 42 within the blank of which coupling 34 is formed, the machining operation to provide sealing surface 50 takes place within cladding member 42 and toroidal planar end surface 52, that is, of the corrosion resistant alloy of which cladding member 42 is formed. A torque shoulder 53 is formed on tubular host 40 and is co-planar with toroidal end surface 52.

Figure 3:
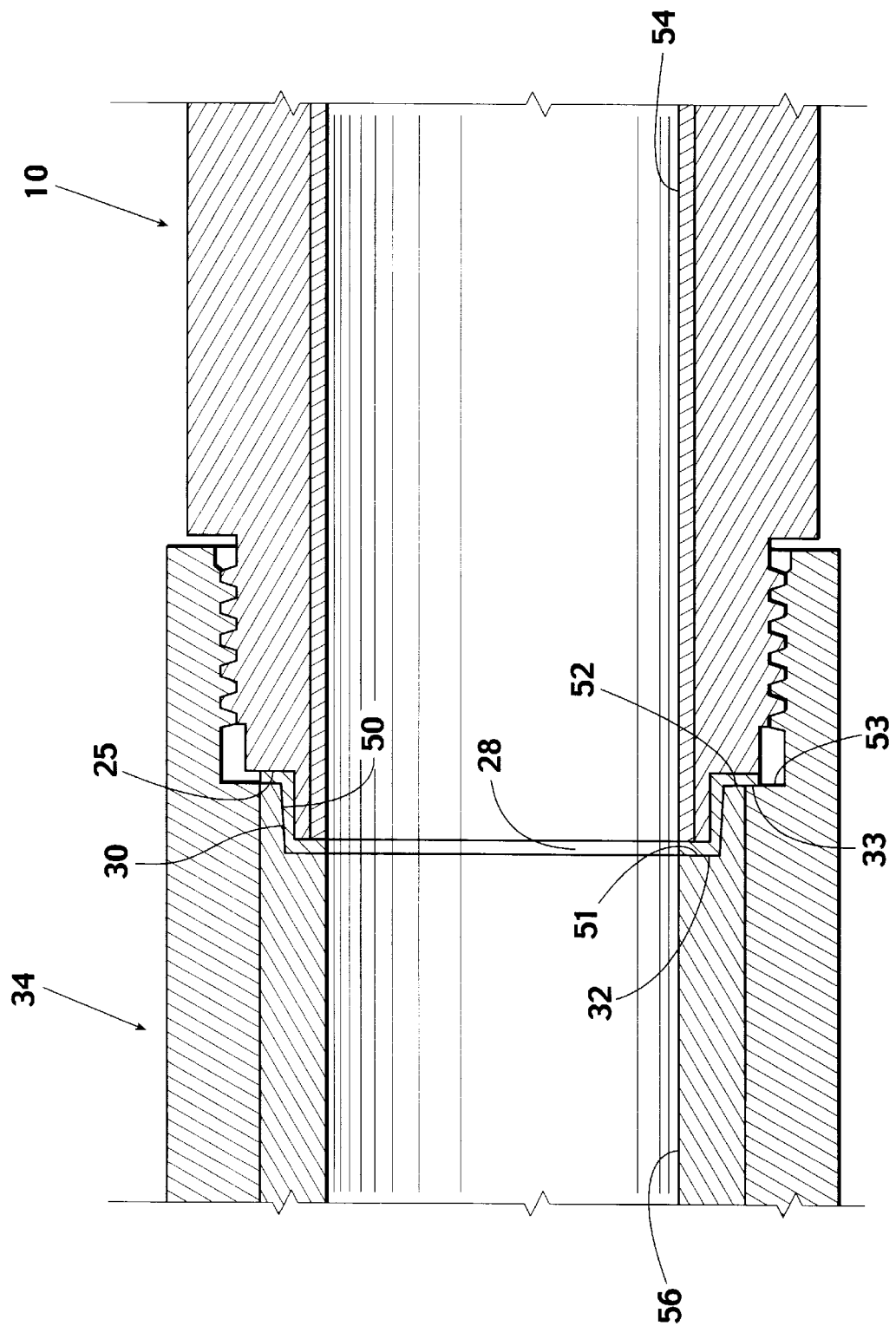
FIG. 3 is a fragmentary cross-sectional view of the end portion of a length of pipe and one end portion of a coupling showing the coupling assembled on the pipe and showing how a corrosion resistant interior surface is maintained through the tubular system.

FIG. 3 is the coupling 34 of FIG. 1 assembled onto the end portion of the length of pipe of FIG. 2. In the illustrated arrangement of FIG. 3 the external diameter of coupling 34 is shown to be greater than the external diameter of pipe 10 however, this is not mandatory and the coupling system can be designed so that the external diameter of the coupling is equal to or not substantially greater than pipe 10.

As the coupling is assembled onto a length of pipe, circumferential frusto-conical surface 30 is telescopically received within coupling frusto-conical sealing surface 50. These frusto-conical tapered surfaces are forced into sealing engagement with each other with the inclined surfaces serving to insure sealing contact. FIG. 3 shows a pipe to coupling sealing system that is three fold, that is: (1) a conical seal between pipe conical surface 30 and coupling conical surface 50; (2) an inner toroidal seal between pipe toroidal end surface 32 and coupling internal radial toroidal surface 51; and (3) an outer toroidal seal between pipe torque shoulder toroidal surface 33 and the coupling torque shoulder formed by co-planar toroidal end surface 52 and torque shoulder 53. Further, it is seen in FIG. 3 that sealing between the end of pipe 10 and the interior of coupling 34 is accomplished in a manner in which all of the internal fluid conducting surfaces are of corrosion resistant alloy. Specifically, it can be seen that fluid, whether liquids or gases, passing through the interior 54 of pipe 10 and the interior of 56 of coupling 34 engage only surfaces formed by corrosion resistant alloy and that the tubular host material 12 of pipe 10 and tubular host material 40 of coupling 34 are not contacted by fluids moving within the piping system.

Note further, with reference to FIGS. 2 and 3, that the planar toroidal end 20 of pipe 12, which is also the toroidal end of circumferential lip portion 24, is fully encompassed by protective cap 28 so as to forestall the possibility of corrosive fluid contacting the pipe lip portion. Further, the protective cap 28, formed of corrosive resistant alloy that seals with the corrosive resistant interior lining of the coupling in a tapered sealing system, prevents any possible fluid passageway from the interior of the pipe and coupling to contact the host material of either the pipe or coupling.

As stated above, the coupling system illustrated in the drawings provide three separate sealing contacts, an inner seal, a conical seal and an outer torque shoulder seal. The coupling system need not employ all three seals and can be practiced in a way that does not include the outer torque shoulder seal.

As previously stated, the material of which the pipe tubular host 12 and the coupling tubular host 40 is made is preferably steel for the most typical applications and specifically, carbon steel, because of its economy, strength, workability and ready availability, whereas the erosion resistant material of which cladding member 14 of pipe 10 and cladding member 42 of coupling 34 is made, may be preferably formed of a nickel alloy or stainless steel.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A coupling for joining tubular members in corrosive applications, comprising:

a tubular member having opposed ends and having an outer tubular shell and an inner tubular liner, the inner liner having a cylindrical exterior surface bonded to an inner cylindrical shell surface, the inner liner being of reduced length compared to the outer shell, the outer shell having internal threads at each of the opposed ends, the liner having opposed ends, each of which is defined by an integral, increased internal diameter elongated circumferential lip portion that has an elongated interior frusto-conical shaped sealing surface, the internal diameters of each sealing surface decreasing in the direction towards the tubular member opposite end.

2. The method of manufacturing a coupling for joining tubular members in corrosive applications according to claim 1 wherein in step (c) said internal threads are formed entirely in said coupling blank outer shell.

3. The method of manufacturing a coupling for joining tubular members in corrosive applications according to claim 1 in which, after step (b) and before step (c) a coaxial recess of selected length is machined in each end of said coupling blank, the internal diameter of each coaxial recess serving to remove said inner liner for such selected length whereby said threads formed in step (c) are formed entirely in said coupling blank outer shell.

* * * * *